(12) United States Patent
Mansur Lopes

(10) Patent No.: US 11,643,260 B2
(45) Date of Patent: May 9, 2023

(54) INDUSTRIAL PACKAGE WITH NEUTRAL WAX SKIN

(71) Applicant: Fuad Mansur Lopes, Guarauja (BR)

(72) Inventor: Fuad Mansur Lopes, Guarauja (BR)

(*) Notice: Subject to any disclaimer, the term of this patent is extended or adjusted under 35 U.S.C. 154(b) by 826 days.

(21) Appl. No.: 16/455,594

(22) Filed: Jun. 27, 2019

(65) Prior Publication Data

US 2020/0010254 A1    Jan. 9, 2020

(51) Int. Cl.
*B65D 65/46* (2006.01)
*B65D 65/42* (2006.01)
*B65D 79/00* (2006.01)

(52) U.S. Cl.
CPC ........... *B65D 65/466* (2013.01); *B65D 65/42* (2013.01); *B65D 79/00* (2013.01); *B65D 2565/381* (2013.01)

(58) Field of Classification Search
CPC ......................... B65D 2565/381; B65D 65/42; B65D 65/466; B65D 79/00; C09D 191/06
See application file for complete search history.

(56) References Cited

U.S. PATENT DOCUMENTS

| | | | | | |
|---|---|---|---|---|---|
| 3,034,174 | A | * | 5/1962 | Kranc | C11C 5/023 249/94 |
| 5,976,897 | A | * | 11/1999 | Gomez | H01L 21/56 438/4 |
| 2006/0144246 | A1 | * | 7/2006 | Holliday | A47J 37/1271 99/403 |
| 2010/0084457 | A1 | * | 4/2010 | Tsakiris | B65D 85/20 229/87.05 |
| 2017/0190145 | A1 | * | 7/2017 | Ballenas | B29C 67/241 |
| 2019/0239451 | A1 | * | 8/2019 | Warmerdam | A01N 3/00 |

* cited by examiner

*Primary Examiner* — Andrew M Tecco
*Assistant Examiner* — Nicholas E Igbokwe
(74) *Attorney, Agent, or Firm* — Edwin Tarver

(57) ABSTRACT

A surfboard wax packaging apparatus for an ingot of surfboard wax includes a heated paraffin tank configured for holding the ingot of surfboard wax and heating paraffin wax until molten. A quantity of 100% neutral inert paraffin wax is placed in the heated paraffin tank sufficient to cover the ingot of surfboard wax when submerged therein. A holder having a handle portion, an extension portion and a mount is provided. The handle portion is configured for hanging the holder on a rod, and the mount is configured to securely hold the ingot of surfboard wax, the extension portion keeps the handle portion outside the heated paraffin tank when the ingot is submerged in the paraffin tank, and a rod is provided for hanging the handle portion to allow the paraffin-encased ingot of surfboard wax to cool and dry prior to re-submersion.

6 Claims, 2 Drawing Sheets

INDUSTRIAL PACKAGE WITH NEUTRAL WAX SKIN

RELATED APPLICATIONS

This application claims priority to Brazil Patent Application Serial No. BR 102018013942-8, "Industrial Packaging with Neutral Wax Film," which was filed on Jul. 6, 2018.

BACKGROUND

Field of the Invention

The present invention generally relates to anti-slip wax applications. More specifically, the present invention relates to a package for surfboard wax formed as a neutral and biodegradable wax skin.

Related Art

As currently known in the art, manufacturers of wax for , paraffin, or similar products for surfboards package their products in non-biodegradable plastic or cellophane materials. Even if biodegradable materials are used (such as paper, aluminum, cardboard, or boxes of other various materials), the packaging is separate from the wax itself. Such packages are frequently improperly discarded by users. If not discarded in a proper trash receptacle, such packaging pollutes surrounding areas. Compounding this problem, materials such as cellophane may not be readily recyclable. Additionally, since such packages are frequently used in beach environments, where garbage receptacles are not readily available, improperly discarded packaging can contribute to ocean pollution, including exacerbating the problem of plastic contamination.

Thus there is a need for a packaging design that provides a package for surfboard wax (or similar non-slip material) without using and plastic, cellophane, paper, aluminum, boxes, or carton packaging. Additionally, there is a need for packaging that is semi-permanently attached to the surfboard wax, and which is biodegradable after the surfboard wax in the package has been entirely used.

SUMMARY

In a first embodiment, a surfboard wax packaging apparatus is provided for a tablet or ingot of surfboard wax. The apparatus includes a heated paraffin tank configured for holding the ingot of surfboard wax. The heated paraffin tank preferably includes temperature controls and is capable of heating paraffin wax until molten (i.e., in a liquid state). A quantity of 100% neutral inert paraffin wax in the heated paraffin tank. The quantity is preferably sufficient to cover the ingot of surfboard wax when submerged therein.

A holder is provided for holding the ingot of surfboard wax. The holder preferably includes a handle portion, an extension portion and a mount. The handle portion is configured for hanging the holder on a rod, and the mount is configured to securely hold the ingot of surfboard wax. The extension portion is configured such that the handle portion remains outside the heated paraffin tank when the ingot is submerged in the paraffin tank, and a rod is provided for hanging the handle portion, thereby allowing a paraffin-encased ingot of surfboard wax to cool and dry prior to re-submerging the paraffin-encased ingot of surfboard wax.

In this embodiment the mount may be configured for insertion into the ingot of surfboard wax. The ingot of surfboard wax may be formed as a cylinder having a channel scored across its top surface in order to split the packaged ingot of surfboard wax upon purchase. The handle portion is preferably U-shaped for hanging on a rod. Additionally, a label is applied to the paraffin-encased ingot of surfboard wax prior to the paraffin-encased ingot of surfboard wax being re-submerged in the paraffin tank. The paraffin is preferably configured to enter a liquid state at substantially 100 degrees Celsius, and may be colored a predetermined color in order to visually contrast with the ingot of surfboard wax.

The invention may also be characterized as a package apparatus for a surfboard wax ingot. The package apparatus includes a portion of a quantity of 100% neutral paraffin, the quantity of 100% neutral paraffin being measured, such that the surfboard wax ingot can be completely submerged in the 100% neutral paraffin, when melted. The surfboard wax ingot having been submerged in the 100% neutral paraffin wax when melted, such that the portion of a quantity of 100% neutral paraffin has been retained, surrounding the surfboard wax ingot. The surfboard wax ingot may have been submerged for substantially fifteen seconds before removal from the 100% neutral paraffin wax. The surfboard wax ingot may further have been submerged multiple times in the 100% neutral paraffin wax, and the paraffin wax preferably completely encases the surfboard wax ingot.

In this embodiment, the surfboard wax ingot may be formed as a cylinder. The cylinder preferably has a channel scored across its top surface. Additionally, a label may be applied to the surfboard wax ingot under a layer of the 100% neutral paraffin, applied by having re-dipped the surfboard wax ingot into the 100% neutral paraffin after application of the label, and thin enough such that the label can be seen through the 100% neutral paraffin. The paraffin may be configured to enter a liquid state at substantially 100 degrees Celsius, and may be colored a predetermined color in order to visually contrast with the ingot of surfboard wax.

The invention may also be characterized as a method of forming a package for a surfboard wax ingot. The method includes the steps of providing an ingot of surfboard wax, wherein the ingot is a solid quantity of the surfboard wax formed into a predetermined preferred shape. A holder is provided for holding the ingot, and a heated bath is provided, the heated bath having temperature controls. A quantity of paraffin, sufficient for submerging the ingot, is provided and placed in the heated bath. The paraffin is then heated using the temperature controls until the paraffin is molten, and entirely in a liquid state. Thereafter the holder is used to dip the ingot in the paraffin and remove the ingot from the paraffin before the ingot softens, and after drying and cooling, the ingot is re-dipped in the paraffin until a coating of paraffin of a predetermined thickness entirely encases the ingot, thereby forming a package for the surfboard wax. The packaged ingot may then be removed from the holder.

The method may include the step of forming or providing a cylindrical surfboard wax ingot and forming a score line across its top surface. The method may also include the step of providing a handle portion on the holder, with the handle portion configured for hanging the holder on a rod. The method may also include the step of forming providing an extension portion on the holder between a handle portion and a mount, and the mount is configured to hold the ingot. Additionally, the method may include the step of dipping the ingot in the paraffin for substantially 15 seconds, and hanging the holder on a rod to allow the paraffin to cool and solidify. As in the other embodiments, the method may include coloring the paraffin such that it contrasts with the ingot of surfboard wax.

Figure 1:
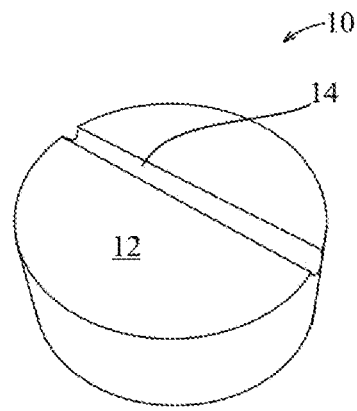
FIG. 1 illustrates an ingot or tablet of surfboard wax ready to be packaged according to the present technique.

REFERENCE NUMBERS 10. tablet
12. circular top surface
14. channel
16. holder
18. heated paraffin tank
20. temperature controls
22. paraffin
24. handle portion
26. extension portion
28. mount
30. rod
32. surf wax package

DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The present invention relates to packaging, and more specifically to a package for waxes and paraffins used on surfboards or other sports that use waxes or similar materials. More specifically, the packaging product is designed to eliminate packaging waste of any kind in the procurement and use of surfboard wax and similar paraffins.

Currently, manufacturers of wax, or similar products for surfboards, package their products in plastic, cellophane, paper, aluminum, cardboard, or boxes of various materials. Because the packaging is separate from the wax itself, such packages are frequently discarded by users. If not discarded in a proper trash receptacle, the packaging can pollute the surrounding area. Compounding this problem, materials like cellophane are resistant to biodegrading, and may not be recyclable. Additionally, since surfing is an ocean sport, the improperly discarded packaging can contribute to ocean pollution, including exacerbating the problem of free floating ocean plastics.

The packaging design of the instant invention is a package for surfboard wax without using and plastic, cellophane, paper, aluminum, boxes, or cartons. This is accomplished by providing a packaging semi-permanently attached to the surfboard wax, and which is biodegradable once the surfboard wax has been used.

In order to accomplish such a configuration and solve the problems in the art, the present method and apparatus has been developed to create a protective film which surrounds an entire ingot or 'tablet' of surf wax or paraffin, which is waterproof, seals, and protects the wax or paraffin from the elements over time. The process of forming the packaging is achieved by immersing the surfboard wax or paraffin tablet in a liquefied packaging material with the aid of an instrument. In a neutral melted wax tank, preferably at around 100° Celsius, the tablet of surfboard wax is dipped for preferably 15 seconds, when the surf wax or paraffin tablet is withdrawn from the tank, it is set to dry. By this process, the tablet is already waterproofed, protected and sealed by the neutral wax simply by forming the packaging.

The invention may be better understood with reference to the aforementioned FIGS. 1-4.

Referring to FIG. 1, an ingot of surfboard wax formed in the shape of a hand-held tablet 10 is shown. The tablet 10 in the illustrated embodiment is formed as a round cylindrical unit having a circular top surface 12 with a channel 14 scored medially across the top surface 12. The channel 14 may assist a user with breaking open the package to provide a face of surf wax ready for use while the packaging remains surrounding the remainder of the tablet 10.

Figure 2:
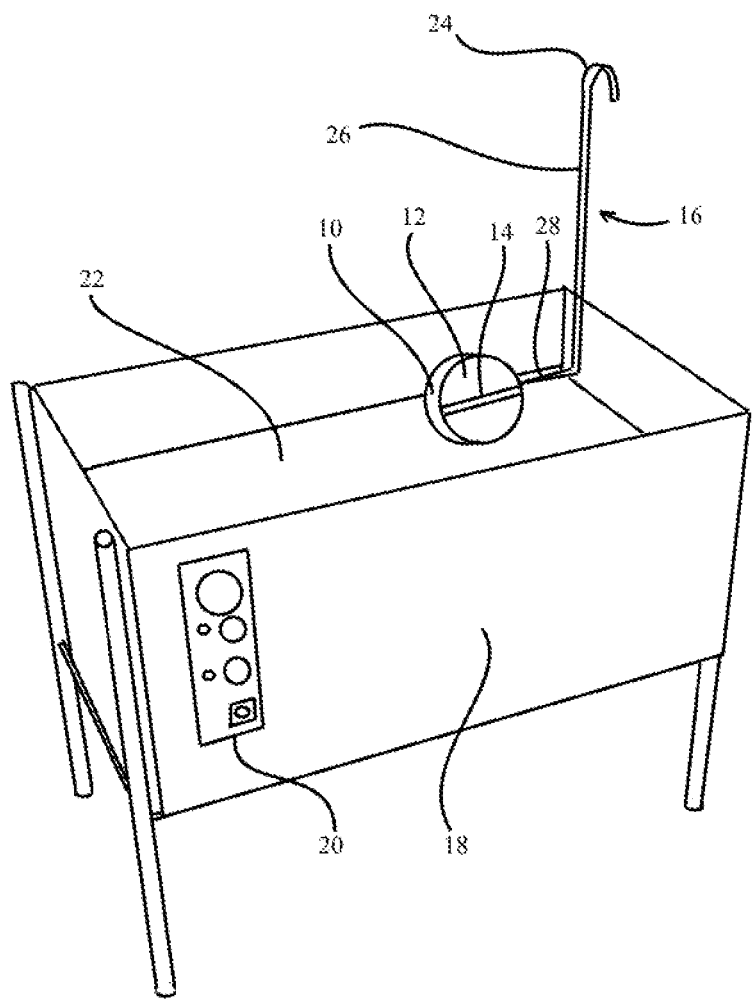
FIG. 2 illustrates an ingot or tablet of surfboard wax in the process of being submerged in a paraffin tank.

Referring to FIG. 2, the tablet 10 is shown attached to a holder 16 and being lowered into a heated paraffin tank 18. The heated paraffin tank 18 contains a quantity of paraffin 20, heated to maintain it in a liquid or molten state. The heated paraffin is preferably 100% neutral. The heated paraffin tank 18 preferably includes temperature controls 20 for maintaining the paraffin 22 in its liquid or molten state. In some instances, the tablet 10 may be maintained at a cooler temperature, to avoid softening or melting of the surf wax when the tablet 10 is submerged into the paraffin 22. In the illustrated embodiment, the holder 16 includes a handle portion 24 for manipulating the holder 16, an extension portion 26 to avoid contact with the paraffin 22 by the handle portion, and a mount 28 on which the tablet 10 is mounted. The mount 28 may also comprise a sharpened portion (not shown) for piercing the tablet 10 and holding it securely as it is dipped in the paraffin 22.

Figure 3:
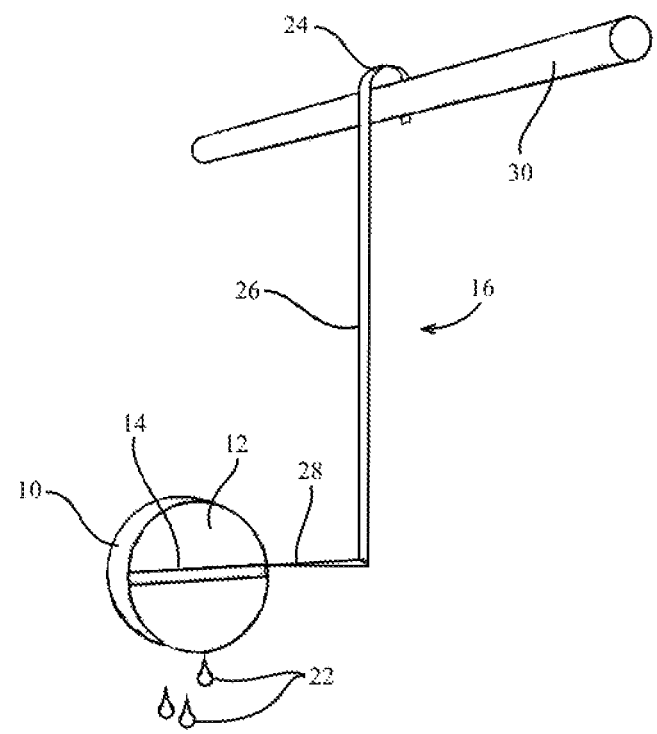
FIG. 3 illustrates the process of drying and solidification of the paraffin wax around the ingot or tablet of surfboard wax.

Referring to FIG. 3, the process of drying and solidification of the paraffin 22 around the tablet 10 of surfboard wax is shown. In one preferred embodiment, where the tablet 10 is hand-dipped in the heated paraffin tank 18 (FIG. 2), once the tablet 10 has been submerged in the paraffin 22, the handle portion 24 of the holder 16 may be hung on a rod 30 and allowed to cool and dry. Preferably excess paraffin 22 is allowed to drip off the tablet 10, and back into the paraffin tank 18. In various embodiments, the holder 16 bearing the tablet 10 may be dipped into the heated paraffin tank 18 multiple times, allowing the paraffin 22 to dry between each dipping to build up a coat of paraffin of preferred thickness. In various other embodiments, the drying time may be altered according to preference.

Figure 4:
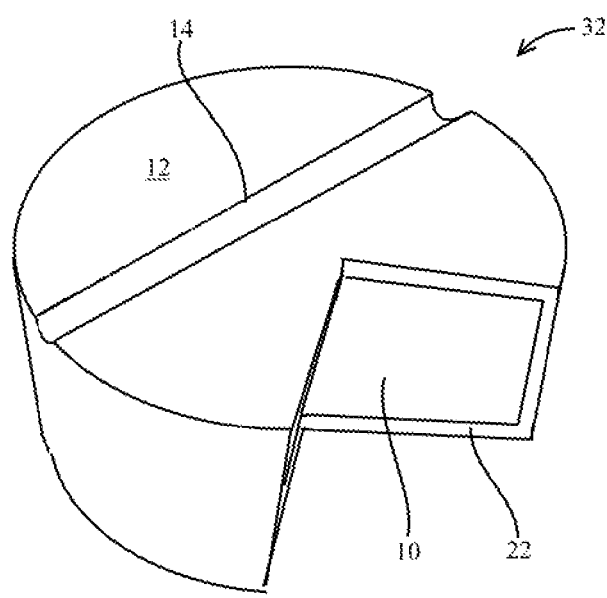
FIG. 4 illustrates a surfboard wax package surrounding the tablet of surfboard wax, with a wedge removed to show a cross section of the package.

Referring to FIG. 4, a cut-away view of the finished surf wax package 32 surrounding the surf wax tablet 10 is shown, with a wedge-shaped potion of the surf wax tablet 10 and surf wax package 32 removed. Once the tablet 10 has been dipped in the heated paraffin bath (FIG. 2) several times, and allowed to cool and dry (FIG. 3) sufficiently, the surf wax package 32 will have formed around the tablet 10. The surf wax package 32 may be marked appropriately for sale, with trademark indicia, barcode and pricing information, etc., but requires no external packaging other than the surf wax package itself. This allows multiple surf wax packages 32 to be formed, and shipped in bulk without any further packaging steps.

In order to use the surf wax package 32 and surf wax 10 of the present invention, a user simply procures a surf wax package 32, and peels or rubs off a portion of the paraffin 22 to expose the tablet 10. Alternatively, the tablet 10 may be cracked along the channel 14, thereby exposing the tablet 10. The surf wax tablet 10 may then be used to apply surf wax to a surfboard or other surface. Once the surf wax tablet 10 is used up, any remaining surf wax packaging 32 may be disposed of. Since the surf wax packaging 32 is 100% neutral and inert paraffin wax, in the event the remaining surf wax packaging 32 is improperly disposed of, it is biodegradable, and thus avoids polluting the environment.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus for forming a surfboard wax package around an ingot of surfboard wax, the apparatus comprising:
   a heated paraffin tank configured for holding the ingot of surfboard wax, the heated paraffin tank having temperature controls and capable of heating paraffin until molten;
   the paraffin in the heated paraffin tank sufficient to cover the ingot of surfboard wax when submerged therein;
   a holder for holding the ingot of surfboard wax, the holder comprising a handle portion, an extension portion and a mount;
   the handle portion configured for hanging the holder on a rod;
   the mount configured to securely hold the ingot of surfboard wax;
   the extension portion configured such that the handle portion remains outside the heated paraffin tank when the ingot is submerged in the paraffin tank;
   the rod thereby allowing a paraffin-encased ingot of surfboard wax to cool and dry prior to re-submerging the paraffin-encased ingot of surfboard wax; and
   wherein a label is hand applied to the paraffin-encased ingot of surfboard wax prior to the paraffin-encased ingot of surfboard wax being re-submerged in the paraffin tank, thereby creating a visible label under the paraffin.

2. The apparatus of claim 1 wherein the mount is configured for insertion into the ingot of surfboard wax.

3. The apparatus of claim 1 wherein the ingot of surfboard wax is formed as a cylinder having a channel scored across its top surface.

4. The apparatus of claim 1 wherein the handle portion is U-shaped.

5. The apparatus of claim I wherein the paraffin is configured to enter a liquid state at substantially 100 degrees Celsius.

6. The apparatus of claim 1 wherein the paraffin is colored a predetermined color in order to visually contrast with the ingot of surfboard wax.

* * * * *